June 15, 1954
H. ZABILKA
2,681,249
NOZZLE FOR VEHICLE WINDSHIELD CLEANERS
Filed Aug. 19, 1949
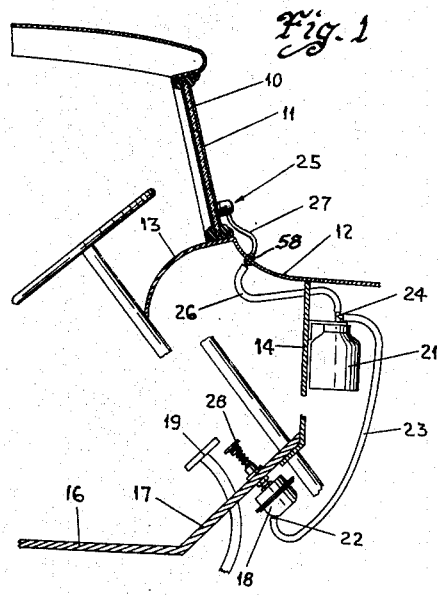
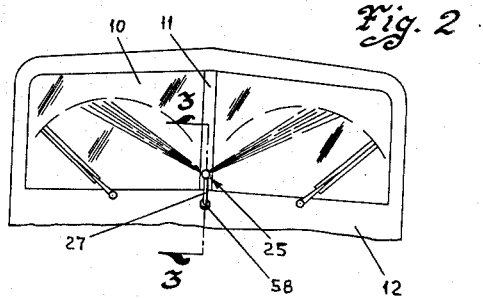
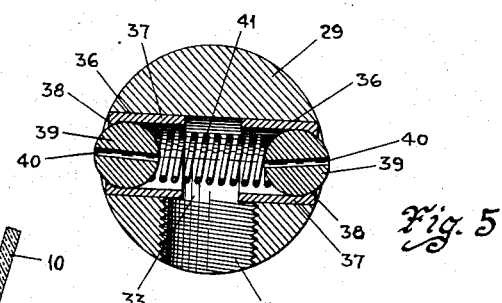
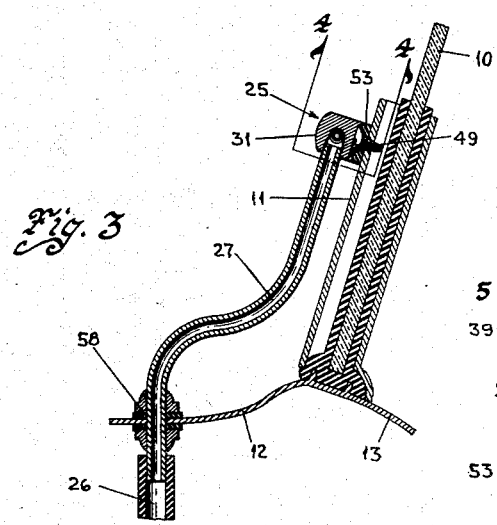
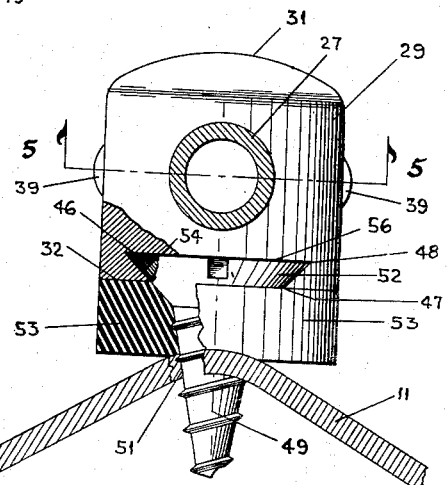
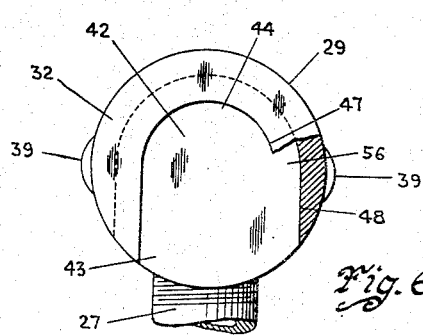
INVENTOR.
Harvey Zabilka
BY
Rudolph L. Lowell
Attorney Patented June 15, 1954

2,681,249

UNITED STATES PATENT OFFICE 2,681,249

NOZZLE FOR VEHICLE WINDSHIELD CLEANERS

Harvey Zabilka, Des Moines, Iowa, assignor to The Delman Company, Des Moines, Iowa, a partnership Application August 19, 1949, Serial No. 111,195

1 Claim. (Cl. 299—58)

This invention relates generally to vehicle windshield washing systems and in particular to a nozzle structure for such systems.

An object of this invention is to provide an improved nozzle structure for a vehicle windshield washer.

A further object of this invention is to provide a double jet nozzle structure for a vehicle windshield washer capable of being readily mounted on a windshield dividing strip and within the transverse dimensional confines of the strip.

Still another object of this invention is to provide a nozzle structure for a vehicle windshield washer which is mountable directly on the windshield dividing strip such that the installation is economically and quickly made with a minimum of defacement to the strip.

A feature of this invention is found in the provision of a nozzle for a vehicle windshield washer in which a body member is formed with a transverse fluid passage having an inlet open to the bottom side of the body member and a pair of transversely spaced oppositely arranged outlets. The rear end of the body member is formed with an upright groove, open at its bottom and closed at its top. The entire side wall of the groove is under-cut so that its outer edge overhangs its lower edge. A mounting screw, is threadable directly into the dividing strip with its head portion projected forwardly of the dividing strip. This head member is of a size and shape such that it is slidable within the groove and the under-cut side wall of the groove to an engaged position with the closed end of the groove, whereby the body member is supported on the dividing strip. A substantially rigid supply line connected between the nozzle inlet and the engine cowl, which extends forwardly of the windshield, holds the body member against upward movement relative to the mounting screw.

Further objects, features and advantages of this invention will become apparent from the following description when taken in connection with the accompanying drawings in which:

Fig. 1 is a fragmentary foreshortened longitudinal sectional view of a vehicle showing a windshield washer, embodying the nozzle structure of this invention, assembled thereon;

Fig. 2 is a fragmentary front view of a vehicle windshield showing the position of the nozzle structure thereon;

Fig. 3 is an enlarged detail sectional view of the nozzle structure taken along the line 3—3 in Fig. 2;

Fig. 4 is an enlarged sectional view taken substantially on the line 4—4 in Fig. 3 with certain parts being broken away for the purpose of clarity;

Fig. 5 is a sectional view taken along the line 5—5 in Fig. 4; and,

Fig. 6 is a rear elevational view of the nozzle body member with parts broken away and other parts in section for the purpose of more clearly showing its construction.

With reference to the drawings there is illustrated in Figs. 1 and 2 a windshield clearing or washing system applied to an automobile having a divided windshield 10 provided with a center dividing strip or mullion 11, an engine cowl 12 extended forwardly from the windshield, and an instrument panel or dashboard 13 located rearwardly of the windshield. The automobile is further equipped with the usual fire wall 14 and floorboard 16 having an upwardly and forwardly inclined portion 17 which joins with the lower end of the fire wall 14.

The windshield washer system includes a pump unit 18 supported from the floor board portion 17 at a position adjacent to the vehicle clutch pedal 19, a liquid container or reservoir 21 carried on the front side of the fire wall 14, and the nozzle, indicated generally at 25, which is carried on the center dividing strip 11. The pump unit 18 is of a diaphragm type and has a single fluid connection 22 connected through a flexible conduit 23 with a valve unit 24 supported on the container 21. A second flexible conduit 26 is connected between the valve unit 24 and a fluid supply tube 27 for the nozzle 25. A foot operated spring return plunger 28 for the pump unit 18, extends upwardly from the floor board portion 17 at a position near the clutch pedal 19. The valve unit 24 is of a construction such that on depression of the plunger 28 fluid under pressure is discharged from the nozzle 25 and on the return or upward movement of the plunger 28 fluid is drawn into the pump 18.

The nozzle 25 includes a body member 29 (Figs. 4 and 5) of a substantially cylindrical shape. One end 31 of the body member, which for convenience will be hereinafter referred to as its front end, is of a curved or dome shape, while the rear end 32 of the body member 29 is flat.

Formed within the body member 29 is a transverse fluid passage 33, of a substantially T-shape, comprised of a threaded inlet section 34, open to the bottom side of the body member 29, and a pair of oppositely extended lateral outlet sections 36. Each outlet section 36 is provided with a sleeve member 37 formed with seats 38 at their outer ends for seating engagement with jet ball members 39. The ball members 39 are yieldably maintained against the seats 38 by a common coil spring 41 arranged in compression therebetween, and located within the outlet sections 36. Thus by inserting a pin or like member within the jet ball passages 40, which extend diametrically of the ball members 39, the ball members are movable to an adjusted position and then maintained in such adjusted positions by the action of the spring 41.

The rear end 32 of the body member 29 (Figs. 4 and 6) is formed with an upright transverse groove 42 arranged in a parallel relation with the fluid inlet section 34. The groove 42 has its lower end 43 open to the bottom side of the body member 29 and its upper end 44 closed and of a substantially semi-circular contour in shape. The side-wall of the groove 42 is formed with a continuous undercut portion 46 of a V-shape in transverse cross-section so that the outer edge 47 of the groove 42 overhangs its inner edge 48. As best appears in Fig. 6, the undercut portion 46 is continuous even to extending about the closed end 44 of the groove 42.

In the mounting of the nozzle 25 on the windshield dividing strip 11 there is provided a self-tapping metal screw 49 (Figs. 3 and 4) which is threadable within an opening 51 formed in the dividing strip 11 to a position such that its head member 52 is projected forwardly from the front edge of the dividing strip 11. A rubber washer 53 is arranged between the head member 52 and the dividing strip 11.

The head member 52 is of a usual conical shape and corresponds to the shape of a transverse cross section through the groove 42 and undercut portion 46 with the innerside 54 of the undercut 46, as best appears in Figs. 4 and 6, being in the plane of the bottom wall 56 of the groove 42. With the fluid supply line 27, which is of a substantially rigid construction, threadably connected with the body member 29 at the fluid inlet section 34, the nozzle structure is positioned adjacent to the parting strip 11, with the lower end 43 of the groove 42 above the head member 52 of the screw 49. On a downward movement of the head member 29 the screw head member 52 is slidably received within the groove 42 to a stop position defined by the engagement of the head member 52 with the closed end 44 of the groove 42 so that the under-cut 46 at the closed end 44 constitutes a receiving pocket for the head member 52, whereby the nozzle is supported against downward movement relative to the screw 49.

On connection of the fluid supply tube 27 with the cowl 12, as indicated at 58, the nozzle 25 is maintained against movement upwardly relative to the screw 49. It is seen, therefore, that the connection of the fluid supply line 27 between the cowl 12 and body member 29 constitutes a locking or stop means for holding the head member 52 of the screw 49 within its receiving pocket formed in the body member 29. As a result the body member 29 is positively held against up and down movement relative to the screw 49, with the rubber washer 53 acting to yieldably hold the body member 29 against movement longitudinally of the screw 49.

From a consideration of the above description, it is seen that the invention provides a nozzle structure which is of a simple and compact construction and readily mountable on the dividing strip 11 and within the transverse dimensions thereof, by a simple inserting action of the screw member head 52 within the lower open end 43 of of the groove 42.

Although the invention has been described with respect to a preferred embodiment thereof, it is to be understood that it is not to be so limited since changes can be made therein which are within the full intended scope of this invention as defined by the appended claim.

I claim:

For use with a vehicle which includes a nozzle supporting member, a windshield clearing system including a nozzle, means for mounting the nozzle on said supporting member including a body member for said nozzle formed with a transverse groove in one end thereof, with said groove being open at one end to one side of said body member and having the other end thereof closed, with the side walls of said groove being formed with a continuous under cut portion, a screw adapted to be threaded into said supporting member and having a head portion of a shape to be received within said groove in contact engagement with the walls of said under cut portion to a position within the closed end of said groove, and means including a fluid supply line for said nozzle attached to said body member so as to hold said head portion within the closed end of said groove.

References Cited in the file of this patent

UNITED STATES PATENTS

| Number | Name | Date |
|---|---|---|
| 541,114 | Nolan | June 18, 1895 |
| 644,080 | Huebel | Feb. 27, 1900 |
| 1,127,596 | Crabiel | Feb. 9, 1915 |
| 1,337,012 | Goodwin | Apr. 13, 1920 |
| 1,496,282 | Taylor | June 3, 1924 |
| 1,651,987 | Baker | Dec. 6, 1927 |
| 2,012,218 | Burress | Aug. 20, 1935 |
| 2,126,624 | Eaddy | Aug. 9, 1938 |
| 2,195,013 | Rastetter | Mar. 26, 1940 |
| 2,229,815 | Nerbovig | Jan. 28, 1941 |

FOREIGN PATENTS

| Number | Country | Date |
|---|---|---|
| 2,729 | Great Britain | of 1906 |
| 18,407 | Great Britain | of 1899 |
| 23,446 | Great Gritain | Dec. 22, 1900 |
| 44,590 | Sweden | Feb. 19, 1916 |